United States Patent [19]

Dietz

[11] 4,306,150

[45] Dec. 15, 1981

[54] THERMAL IMAGE FORMING DEVICE COMPRISING PNEUMATIC INFRARED DETECTORS

[75] Inventor: Wolfgang Dietz, Lilienthal, Fed. Rep. of Germany

[73] Assignee: U.S. Philips Corporation, New York, N.Y.

[21] Appl. No.: 82,396

[22] Filed: Oct. 5, 1979

[30] Foreign Application Priority Data

Oct. 7, 1978 [DE] Fed. Rep. of Germany ...... 2843876

[51] Int. Cl.³ .......................... H01J 31/49; G01J 1/00
[52] U.S. Cl. .................................... 250/332; 250/340
[58] Field of Search ............... 250/330, 332, 342, 338, 250/340, 353; 350/1.3, 1.4, 1.7

[56] References Cited

U.S. PATENT DOCUMENTS

| | | | |
|---|---|---|---|
| 3,551,051 | 12/1970 | Salgo | 350/1.4 |
| 4,038,547 | 7/1977 | Hoesterey | 350/1.3 |
| 4,080,532 | 3/1978 | Hopper | 250/332 |

FOREIGN PATENT DOCUMENTS 2534586 3/1977 Fed. Rep. of Germany .

OTHER PUBLICATIONS

Review of Scientific Instruments, vol. 20, No. 11, Nov. 1949, p. 816.

Primary Examiner—Alfred E. Smith
Assistant Examiner—Janice A. Howell
Attorney, Agent, or Firm—Marc D. Schechter

[57] ABSTRACT

A device for optically displaying thermal image scenes, comprising pneumatic infrared sensors, for example, temperature-sensitive gas cells. A mosaic of thermal IR sensors, which is arranged on an infrared-transparent plate and which picks up the thermal image scene, is arranged in front of a reference plate whose inclination can be adjusted and which is irradiated by optical light. The interference patterns produced are picked up by an optical system. Thermal drift is suppressed by providing the IR sensors in a hermetically sealed chamber.

9 Claims, 3 Drawing Figures

THERMAL IMAGE FORMING DEVICE COMPRISING PNEUMATIC INFRARED DETECTORS

BACKGROUND OF THE INVENTION

The invention relates to a device for optically displaying thermal image scenes, comprising pneumatic infrared sensors, for example, temperature-sensitive gas cells.

It is known, for example, from German Offenlegungsschrift No. 2,534,586 (to which U.K. Pat. No. 1,557,029 corresponds) to pick up thermal image scenes by means of infrared (IR) sensors, followed by conversion of signals from these sensors into optical or electronic signals. The thermal scene is then scanned and, from the radiation picked up by the infrared sensor (sensors), an electrical signal voltage is produced. The electric signal voltage is used, for example, to actuate light emitting diodes or displays for optical display of the thermal image.

The known highly sensitive infrared sensors on the one hand require cooling to a temperature well below room temperature, while on the other hand thermal image forming devices comprising such sensors require complex deflection and scanning means.

From "Review of Scientific Instruments", Volume 20, Number 11, November 1949, pages 816–820, it is known to use a temperature-sensitive gas cell as a pneumatic infrared detector or sensor. Such a gas cell may be, for example, a Golay cell. Variations of the volume of a gas which is exposed to thermal radiation are then converted into mechanical, optically detectable variations of a mirror wherefrom a spectrum of the thermal radiation can be obtained.

For optically displaying of a thermal image scene, however, devices comprising infrared sensors in the form of this known gas cell are not suitable because the mirror construction required for the spectral analysis is much too complex for a thermal image forming device to achieve a nondisturbed display of thermal images and to maintain this display for a prolonged period of time.

SUMMARY OF THE INVENTION

An object of the invention is to provide a thermal imge forming device of the kind described above produces high quality optical displays of thermal image scenes, which is not highly complex, and which does not involve the scanning of scenes, i.e. it utilizes only static means.

This object is realized in that a mosaic of pneumatic infrared sensors, which is accommodated on an infrared-transparent plate and which picks up the thermal image scene, is arranged in front of a reference plate whose inclination can be adjusted and which is irradiated by optical light. The interference patterns, produced by such a device are picked up by means of an optical system.

Preferably, the IR sensors consist of glass capillaries which are polished and surface ground to interference quality on both sides.

In order to suppress thermal drift, otherwise eliminated by chopping, an infrared-transparent germanium plate, an etalon and a wedge-shaped reference plate are joined together by way of their polished surfaces without cement, so that a hermetically sealed chamber is formed in which the channel plate, with the sealed IR sensors is situated.

One of the advantages of the novel thermal image forming device is that the wavelength range for which the device or the sensors are highly sensitive is much wider than in devices with infrared sensors which are to be adapted, for example, individually to each ambient pressure. Moreover, the response time of the sensors need not be on the order of magnitude of microseconds, but may be much larger, while the operating temperature may be room temperature, so that no cooling is required.

DESCRIPTION OF THE PREFERRED EMBODIMENT

Figure 1:
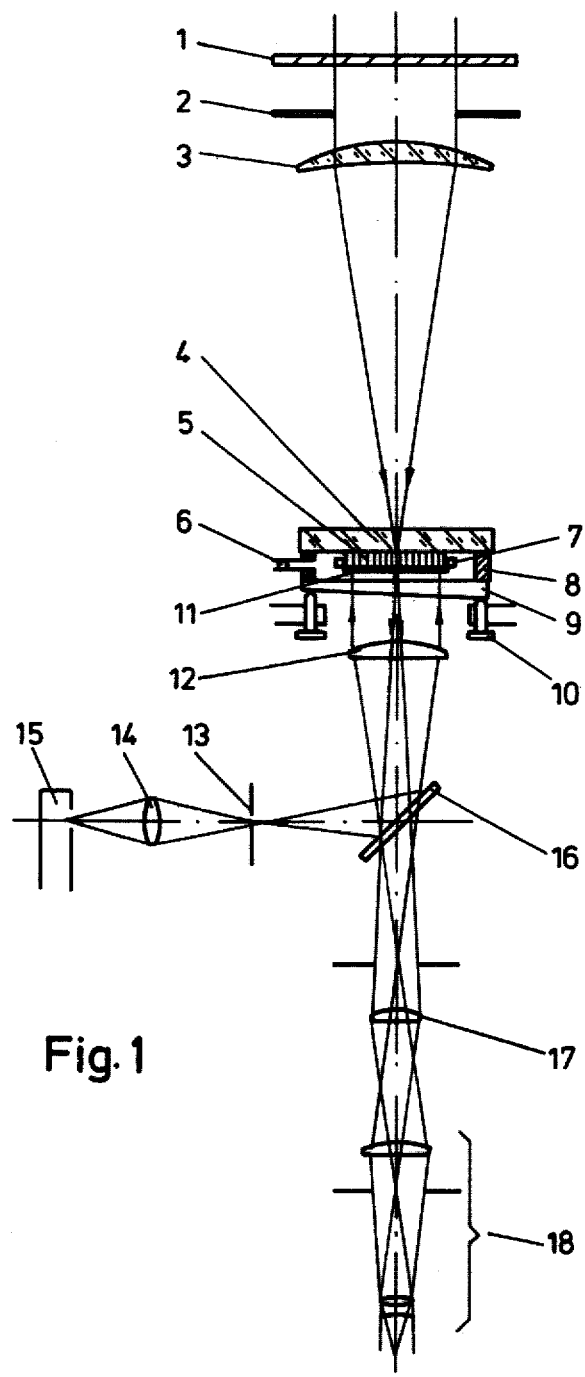
FIG. 1 schematically shows the a complete optical system with a thermal image forming device according to the invention.

In FIG. 1, the scene to be observed is imaged on the rear of an infrared-transparent plate 4, for example a germanium plate, by means of a germanium lens 3. The image forming device can be protected against overloading by means of a protective filter 1 and an iris aperture 2 arranged in front of the germanium lens 3. On the germanium plate 4 there is provided a channel plate 5 which consists of a mosaic of IR sensors 5'. (See FIGS. 2 and 3.) The channel plate is polished and surface ground on both sides to interference quality.

In order to reduce the absorption of infrared radiation by the glass, the side which is joined to the germanium plate 4 is provided with a metal layer (4') by vapor deposition, and with a protective quartz layer (4"). (See, FIG. 3.)

Figure 2:
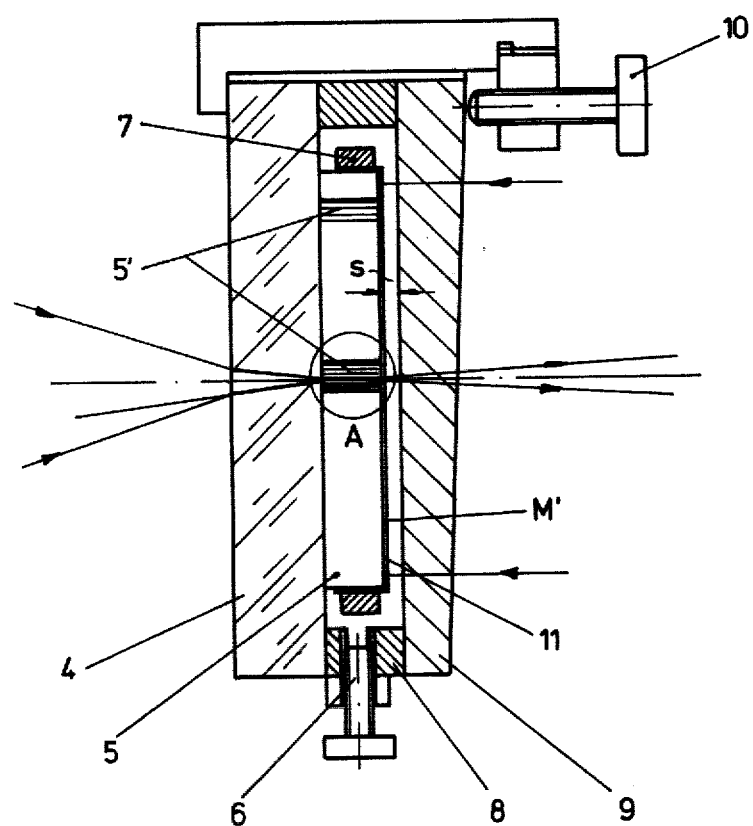
FIG. 2 is a sectional view of a thermal image forming device according to the invention.
Figure 3:
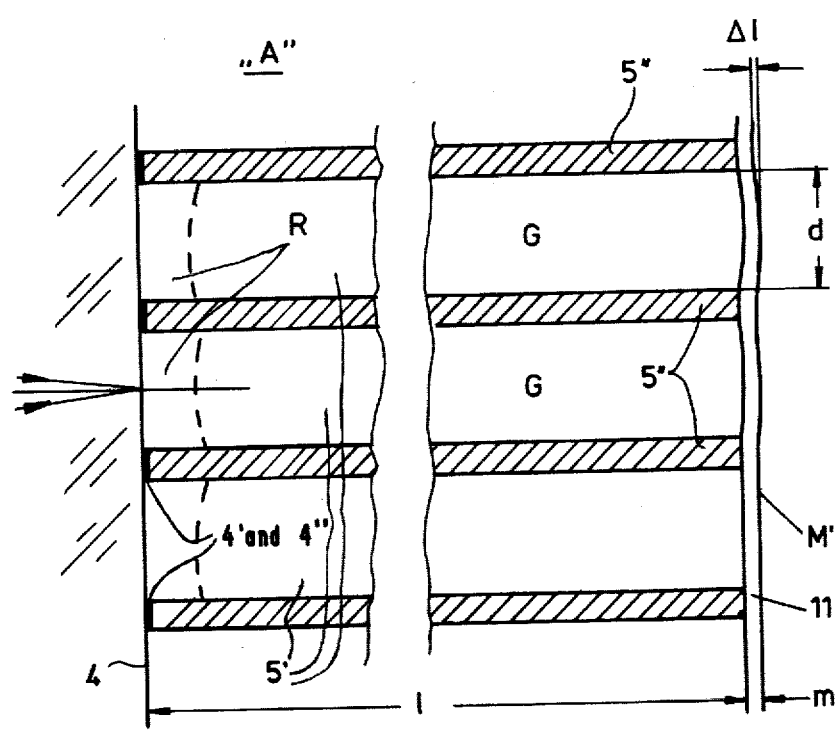
FIG. 3 is an enlarged sectional view of the area marked "A" in FIG. 2.

On the opposite side there is provided a foil 11 of a synthetic material which is connected to the channel plate (5) by adhesion or by means of a clamping device (7), so that no gas can be exchanged between the individual sensors (5'). (FIG. 2.) The outer side of the foil (11) is provided with a metal layer by vapour deposition in order to increase the image brightness. Moreover, disturbing infrared radiation is reflected by the metal layer (M'). (FIG. 3.) "Cross-talk" is avoided due to the poor thermal conductivity of glass (5"). In accordance with the infrared image on the rear of the germanium plate (4), the gas G present in the sensors (5'), or possibly a layer of soot R, absorbs thermal energy, thus causing a bending $\Delta 1$ of the foil (11).

The thermal drift, which in the past has been eliminated by chopping, can be suppressed as follows: the germanium plate (4), an etalon (8) and a wedge-shaped reference plate (9) are joined by way of their polished surfaces, without cement, in order to form a hermetically sealed chamber in which the channel plate (5), with the sealed IR sensors, is present. In response to temperature fluctuations, the pressure in the capillaries and the pressure due to the gas in the chamber changes by the same amount. This means that in the case of a uniform temperature variation of the entire device, the bending $\Delta 1$ of the foil (11) does not change.

The bending $\Delta 1$ of the foil (11) caused by the thermal expansion of the gas is made visible by means of an interferometer. The light from a monochromatic light source (15) is applied, via a collector (14) and an aperture (13), to a beam splitter (16). The interference strips appearing on the wedge-shaped reference plate (9) are observed, via a collimator (12), by the optical system consisting of an objective (17) and an ocular (18). When the mosaic of differently bent capillary end faces is observed, a thermal image is seen whose brightness distribution is equivalent to the absorbed thermal energy. (FIG. 1.)

When a parallelism of <0.23 angular seconds is produced between the foil (11) and the reference plate (9) by means of adjusting the etalon (8), which may be a plane parallel ground quartz or Invar (trademark) ring with an adjusting screw (6), an interference line can fill substantially the entire field of vision.

The distance S between of the etalon (8) and the channel plate (5), with the foil (11), is adjusted to be one fourth ($\frac{1}{4}$) of the wavelength of the monochromatic light source or a multiple thereof, so that a minimum background brightness results therefrom. This realized by means of the screws (10) and (6).

When use is made of a thallium light source (15), monochromatic light having a coherence length of approximately 5 mm is obtained. As a result, the background brightness of the field of vision is low, also in the case of a slightly larger distance S. When the thallium light source (15) is replaced by an incandescent lamp with a double line filter, the coherence length becomes 42 $\mu$m, while a coherence length of only 44 $\mu$m is obtained with light emitting diodes. Therefore, in order to keep the background brightness as low as possible, the distance S may amount to only a few $\mu$m for these simple light sources.

The diameter of the aperture (13) determines the brightness and the contrast of the interference image. The objectives (12) and (17) serve as a reversing system and produce the intermediate image observed by means of the ocular (18).

For a focal length of, for 100 mm of the germanium lens 3 and a diameter of 0.1 mm for the sensors, a resolution of approximately <1.5 mrad is obtained.

When the intensity of the incident infrared radiation is higher, there is a risk that the visible interference image becomes darker again or that irreversible bending occurs. This can be avoided by means of the iris aperture (2) and the protective filter (1). For a nondisturbed image impression, the reference plate (9) should be of interference quality and the foil (11) should have a non-parallelism of $<\lambda/20$.

For example, if the scene is colder than the thermal image device, the device emits more radiation than it receives. This causes a pressure decrease in the capillary sensors and bending inwards into capillaries. For a bending $>\lambda/4$ of this kind, an image is formed in accordance with the absorption of the scene. If a disturbing pressure decrease of this kind is to be avoided, the pressure in the chamber formed by the germanium plate (4), the etalon (8) and the reference plate (9) must be reduced by loosening the screw (6). In the case of slow cooling of the thermal image forming device, the screw (6) must subsequently be tightened again; thus a threshold adaptation value is obtained.

The relationships are reversed when the scene is warmer than the image forming device. Turning of the screw (6) results in a simultaneous density variation in the chamber and hence a variation of the path difference $\Delta 1$ which can be compensated for by means of the pressure screws (10).

Two assumptions are made in describing the operation of the present invention:

(1) The incident infrared radiation is fully absorbed in the gas-filled capillaries.

(2) In the gas-filled capillaries an isobaric variation takes place, i.e. the total radiation energy causes a length increase.

For the length increase $\Delta 1$ of the capillaries, $$\Delta 1 = 1 \gamma \Delta t \tag{1}$$

or $$\Delta t = \Delta 1 / 1 \gamma \tag{2}$$

in which 1 is the length of the gas-filled capillaries, $\gamma$ is the volume expansion coefficient, and $\Delta t$ is the temperature variation. As a result of the temperature increase $\Delta t$, the capillary has absorbed the amount of energy E and the following relation exists $$\Delta 1/E = \gamma/CP \cdot 1/F = K \cdot 1/F \tag{3}$$

in which c is the specific heat of the gas, p is the density of the gas, and F is the cross-sectional area of the capillary.

The length increase $\Delta 1$ of the capillary per absorbed energy amount E is inversely proportional only to the capillary sectional area F, K being a material constant of the gas in the capillary. This material constant is equal to the length increase $\Delta 1$ per energy density E/F or the presence of n photons per mm$^2$.

For liquids, K is only $10^{-3}$ times the value for gases.

The incident infrared radiation can be absorbed by a black layer in the sensors which corresponds to the soot layer R in FIG. 3. The heat can be transferred from the soot by conductivity to the gas which expands. However, the infrared radiation can alternatively be directly absorbed by the gas.

When, for example, ethylene—a non-saturated hydrocarbon combination which can be readily combined with other substances such as halogen—is used as the absorbing gas, insertion of the values of c and p $$CP = 0.37 \text{ cal gr}^{-1} K^{-1}$$

or $$p = 1.26 \cdot 10^{-6} \text{ gr mm}^{-3},$$

results in a material constant K = 7850 mm$^3$ cal$^{-1}$.

In the case of the interferometer having the distance S << coherence length L, reference plate (9) optimally adjusted to the foil (11), and a path difference of $\Delta = \lambda/20$ of the wavelength of the light source (15), a brightness variation of from the background brightness ($1_{min}$) of up to 1/40 of the maximum possible brightness can be obtained.

The path difference $\Delta = \lambda/20$ is obtained when the bending $\Delta 1$ of the foil (11) amounts to $\lambda/40$.

According to the relation $$E/F = \Delta 1/K,$$

for a capillary diameter of 0.1 mm the lowest energy density which can be detected or the radiation density formed in one second, subject to the condition that all incident photons are absorbed in the capillaries and cause an isobaric variation, is $$E/F = 6.9 \cdot 10^{-9} Ws/mm^2$$

For the radiation density difference of an object which is 1° Kelvin warmer than the background, in the described embodiment the infrared radiation had to be incident on the channel plate (5) for 0.055 seconds in order to be detectable. This is a period of time which still allows recognition of comparatively fast moving scenes.

What is claimed is:

1. A device for optically displaying thermal image scenes comprising:
    an infrared-transparent plate;
    a reference plate which, in operation, is irradiated with visible light; and
    a mosaic of infrared sensors arranged on said infrared-transparent plate between said infrared-transparent plate and the reference plate;
    characterized in that the device further comprises a hermetically sealed chamber containing a gas, the infrared sensors comprise pneumatic infrared sensors, and the mosaic of sensors is accommodated in the hermetically sealed chamber.

2. A device for optically displaying thermal image scenes as claimed in claim 1, characterized in that the device further comprises an etalon, the infrared-transparent plate and the reference plate being separated by and hermetically sealed to the etalon to form the chamber.

3. A device for optically displaying thermal image scenes comprising:
    an infrared-transparent plate;
    a reference plate which, in operation, is irradiated with visible light; and
    a mosaic of infrared sensors arranged on said infrared-transparent plate between said infrared-transparent plate and the refernce plate;
    characterized in that the mosaic of infrared sensors comprises a mosaic of pneumatic infrared sensors.

4. A device for optically displaying thermal image scenes, as claimed in claim 3, characterized in that the pneumatic infrared sensors comprise gas-filled glass capillaries.

5. A device for optically displaying thermal image scenes, as claimed in claim 4, characterized in that the diameter of each sensor is approximately 0.1 mm.

6. A device for optically displaying thermal image scenes, as claimed in claim 5, characterized in that the gas comprises ethylene.

7. A device for optically displaying thermal image scenes, as claimed in claim 6, characterized in that the sensors comprise a layer of a heat absorbing material.

8. A device for optically displaying thermal image scenes, as claimed in claim 7, characterized in that the heat absorbing material is soot.

9. A device for optically displaying thermal image scenes, as claimed in claim 4, characterized in that the device further comprises a hermetically sealed chamber containing a gas, and the mosaic of sensors is accommodated in the hermetically sealed chamber.

* * * * *